No. 821,701. PATENTED MAY 29, 1906.
G. H. CHENEY.
DRIVING, BRAKING, AND COASTING MECHANISM.
APPLICATION FILED NOV. 28, 1900.
3 SHEETS—SHEET 1.
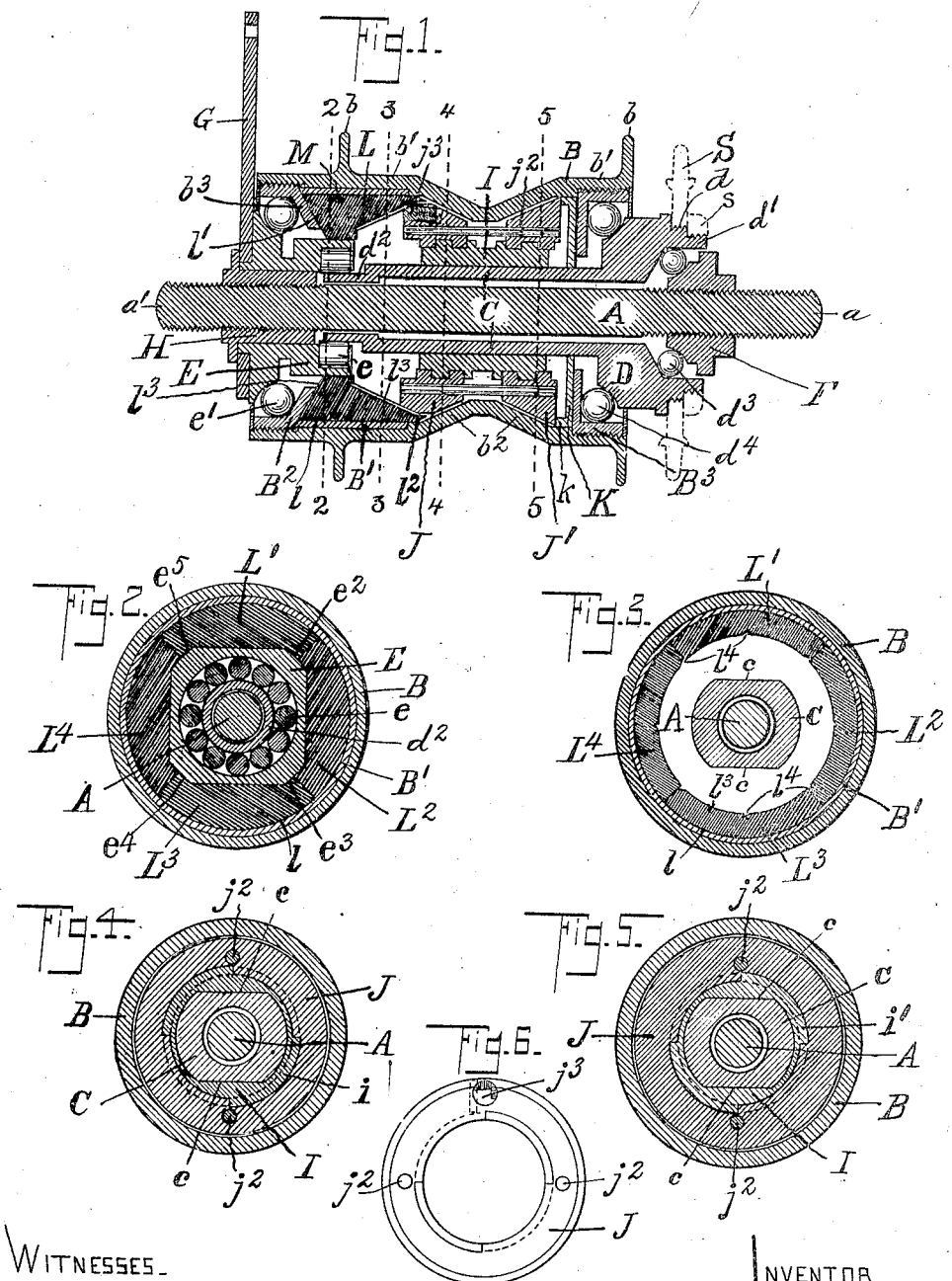
WITNESSES
Anna G. Meagher
Katharine P. ...
INVENTOR
Geo. H. Cheney No. 821,701. PATENTED MAY 29, 1906.
G. H. CHENEY.
DRIVING, BRAKING, AND COASTING MECHANISM.
APPLICATION FILED NOV. 28, 1900.
3 SHEETS—SHEET 2.
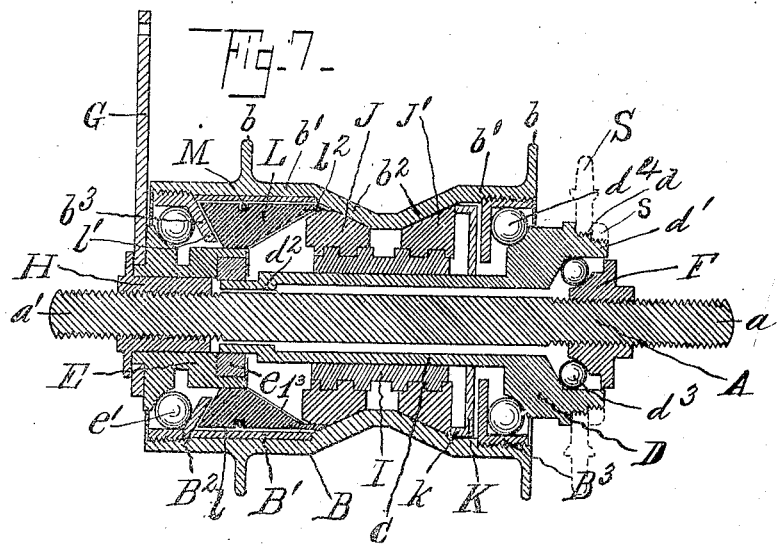
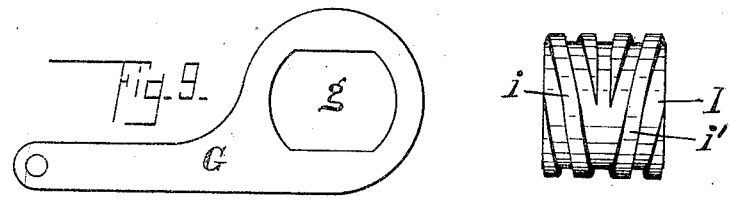
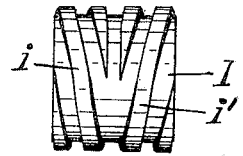
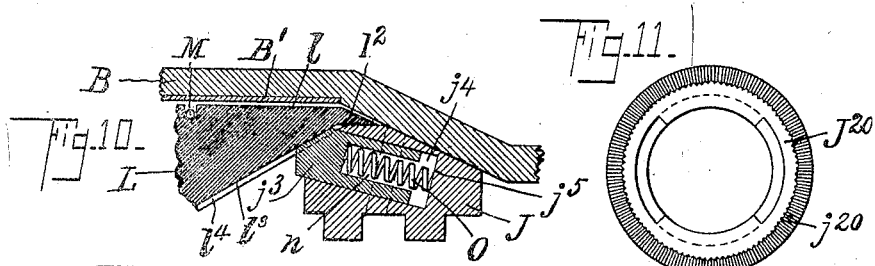
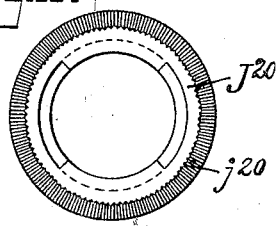
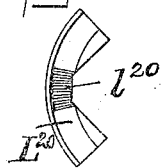
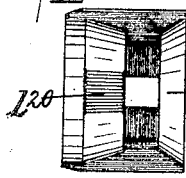
WITNESSES
Anna G. Meagher
Katharine R. Spicer
INVENTOR
Geo. H. Cheney No. 821,701. PATENTED MAY 29, 1906.
G. H. CHENEY.
DRIVING, BRAKING, AND COASTING MECHANISM.
APPLICATION FILED NOV. 28, 1900.
3 SHEETS—SHEET 3.
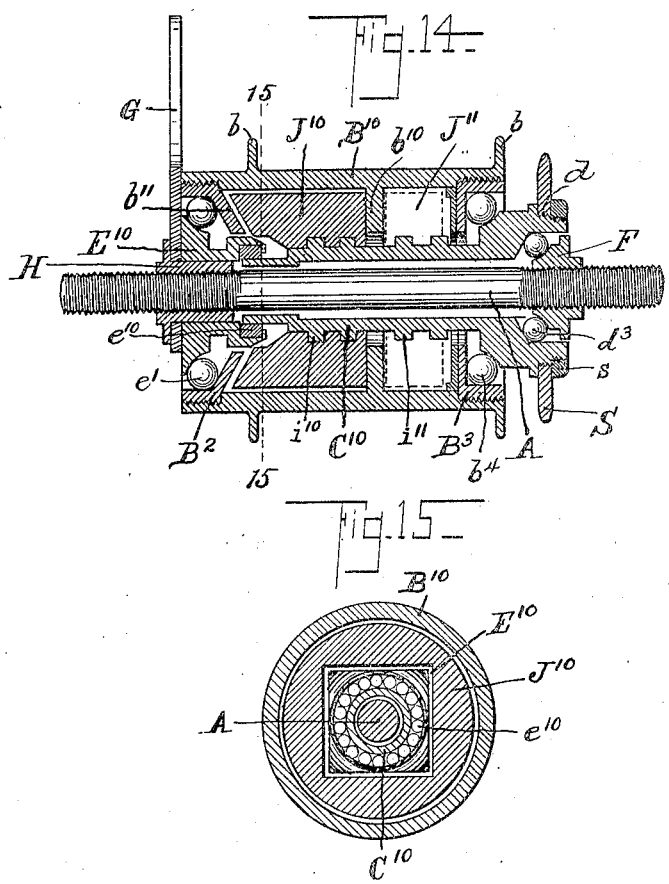
WITNESSES —
INVENTOR —

UNITED STATES PATENT OFFICE.

GEORGE H. CHENEY, OF ROCHESTER, NEW YORK.

DRIVING, BRAKING, AND COASTING MECHANISM.

No. 821,701.   Specification of Letters Patent.   Patented May 29, 1906.

Application filed November 28, 1900. Serial No. 38,010.

*To all whom it may concern:*

Be it known that I, GEORGE H. CHENEY, a citizen of the United States, and a resident of Rochester, in the county of Monroe and State of New York, have invented certain new and useful Improvements in Driving, Braking, and Coasting Mechanisms, of which the following is a specification.

The object of my invention is to provide a driving, a braking, and a coasting mechanism for use in connection with vehicles, and particularly adapted to bicycles.

It consists in the devices and combinations hereinafter set forth and claimed.

In the form of my invention described in this specification and shown in the drawings the driving and the braking mechanisms are so constructed that they coöperate. It is not necessary, however, that the driving and the braking mechanisms should be used together. They may be used separately, and each will be as efficient when so used as when they are used together.

Some of the advantages of my device over prior devices are its greater simplicity and strength, the smaller number of parts involved in its construction, the ease and rapidity with which it can be assembled and taken apart, and the removal of strain upon the bearings when it is in operation.

In the accompanying drawings, Figure 1 is a vertical longitudinal section through the hub of the rear or driving wheel of a bicycle equipped with my driving, braking, and coasting mechanism. In this figure the driving mechanism is shown in its non-engaged position and the braking mechanism in its engaged position, which are the positions that said parts assume on back pedaling. Fig. 2 is a cross-section on the line 2 2 of Fig. 1 looking to the right. Fig. 3 is a cross-section on the line 3 3 of Fig. 1 looking to the right. Fig. 4 is a cross-section on the line 4 4 of Fig. 1 looking to the right. Fig. 5 is a cross-section on the line 5 5 of Fig. 1 looking to the right. Fig. 6 is an end view, looking to the right, of part of the driving mechanism to be described. Fig. 7 is also a vertical longitudinal section of the rear or driving wheel of a bicycle equipped with my driving, braking, and coasting mechanism, the driving mechanism being shown in its engaged position and the braking mechanism in its disengaged position, which are the positions of said parts in forward pedaling. Fig. 8 is a side view of one of the parts of the device. Fig. 9 is a side view of another part. Fig. 10 is an enlarged vertical section of the rear or driving wheel between the lines 4 4 and 5 5 of Fig. 1, showing portions of the mechanism in a non-engaged position; and Figs. 11, 12, 13, 14, and 15 are views of modifications of details.

Reference being had to the accompanying drawings, A is the axle of the rear or driving wheel of the bicycle, and B is its hollow outer hub. The internal portion of this hub which lies between the spoke-flanges $b$ has a portion $b'$ adjacent to each spoke-flange and between these portions $b'$ the conical portions $b^2$, that meet midway between said spoke-flanges. The double conical portions $b^2$ constitute a flange or rib forming part of the hub for the engagement of a friction-clutch. B' is a friction-ring of such size as to fit snugly within the portion $b'$ in one end of said hub. This ring is held in place by a cup $B^2$, that is screwed into the threaded end of the hub B with a right-hand thread and firmly against said ring. The inner hub C is revoluble upon the axle A and has two flattened sides, as shown at $c$ $c$ in Figs. 3, 4, and 5. The outer end of this inner hub C is integral with a collar D. Upon the threaded shoulder $d$ of this collar D is screwed a sprocket-wheel S, through which power is transmitted from the pedals to the rear wheel of the bicycle, or one member of a pair of gears may be attached thereto in like manner, for my invention is adapted to be used in connection both with bicycles that are equipped with chain and sprocket and those that are equipped with many of the chainless gearing devices employed for the transmission of the driving power from the pedals to the driving-wheel. A nut $s$ is screwed upon the threaded end $d'$ of the collar and locks in place the sprocket or the gear, whichever is employed.

The interior of the inner hub C is of larger diameter than the axle A, as shown in Figs. 1 and 7, so that there is no contact between said parts when in position. The inner end $d^2$ of said inner hub is represented in the drawings as of slightly less interior diameter than the rest of the hub and is journaled in the end of a block E upon antifriction-rolls $e$, that are secured in a raceway in said block (see Figs. 1, 2, and 7) in any suitable manner. The block E is supported on the axle A and is non-revoluble, as hereinafter explained. Said inner hub C is revolubly supported at its other end by balls $d^3$, that are placed in a ball-race formed between the inner side of an enlargement or collar D on said inner hub and a cone F, the latter being screwed upon the threaded end $a$ of the axle A. Balls $d^4$ in a ball-race formed between the outer side of the enlargement or collar D, and a cup $B^3$, that is screwed into the end of the hub B with a left-hand thread, retain the said hub in place and permit its free rotation. The said cup $B^3$ has a friction-surface upon its inner side which coöperates with another part of the device, hereinafter to be described, in order to assist in retarding the revolution of the outer hub B on back pedaling. A lever or arm G, that is cut out, as shown at $g$ in Fig. 9, fits upon the end of the block E, before referred to, in the manner indicated in Figs. 1 and 7, and when placed upon said block and attached to the frame of the bicycle by a suitable clamp (not shown) it prevents the said block E from turning. A lock-nut H upon the threaded portion $a'$ of the axle A retains the parts E and G in place and is of proper length and thickness to fit snugly between the block E and the axle A, and thus support the former. (See Figs. 1 and 7.) Balls $e'$ in a ball-race formed between the outside of the block E and the cup $B^2$ afford a bearing for this end of the outer hub B.

I will now describe those features of my invention that particularly relate to the driving mechanism.

A sleeve I (shown in Fig. 8) fits upon the inner hub C. The bore of the said sleeve is fitted to the flat sides $c\ c$ of the said inner hub, as shown in Figs. 4 and 5, so that said sleeve and hub must revolve together. It is best, however, that the sleeve be free to move longitudinally upon the inner hub. Any mode of attaching said sleeve on said hub so as to be non-revoluble thereon, but capable of longitudinal movement thereon, is an equivalent for the construction shown in the drawings. Upon the outside of said sleeve are right and left male threads $i$ and $i'$. (See Fig. 8.) Two clutch members J and J' have female threads corresponding, respectively, with the threads $i$ and $i'$ on the surface of the sleeve I, upon which they are placed. Said clutch members J and J' have surfaces fitting the flange or rib above mentioned on the inside of the outer hub B and are shown as having conical surfaces fitting the inner surfaces of the portions $b^2\ b^2$ of the outer hub B, so that the surfaces of said members J and J' may be brought into close contact with the inner surfaces of the said portions $b^2\ b^2$ of said hub. Finally, pins $j^2\ j^2$ are set in perforations in the members J and J' of said clutch, said perforations being parallel with the axis of said inner hub, so that said members must rotate together, but are at the same time capable of longitudinal movement with reference to each other. It is obvious that the pins $j^2$ may lie loosely within the said perforations in both members or that they may be fastened within one member and lie loosely within the other and that one or several pins may be used. It will be apparent that when the inner hub C is rotated forward with reference to the clutch members J and J' and carries with it the sleeve I the said members J and J' will be made to approach each other until said members are brought into contact with the conical surfaces $b^2\ b^2$ of the outer hub B and that then they will clamp said conical surfaces and operate as a clutch to drive the said outer hub B forward with the inner hub C. I do not limit myself to the exact form of mechanism shown in the drawings, for the several members that constitute it are susceptible of modification without departing from its scope. Thus an inwardly-projecting flange or shoulder $b^{10}$ on the inside of the hub $B^{10}$, integral therewith or attached thereto, (see Fig. 14,) may be clutched by said clutch members in the manner above described. Again, one of said clutch members may be omitted, as shown in full lines in Fig. 14, or the other member may be employed only to press against an abutment, as hereinafter described. The outside of the inner hub $C^{10}$ may be made round (see Fig. 14) instead of flattened, as indicated by $c$ in the drawings, and may have upon its outer surface the right and left hand threads $i^{10}$ and $i^{11}$, as shown in Fig. 14, so as to dispense with the sleeve I; but it will be found in practice that with the particular form of my device shown its several parts can be much more readily assembled when the sleeve I is employed than when the clutch members $J^{10}$ and $J^{11}$ are placed directly upon the inner hub $C^{10}$, and said clutch members will adjust themselves automatically to the flange or rib of the outer hub. In Fig. 14 the clutch member $J^{11}$ is indicated by dotted lines, and in this construction the inner end of the inner hub $C^{10}$ is shown supported on rolls $e^{10}$ in the hub $E^{10}$. (See Fig. 15, which is a cross-section on the line 15 15 of Fig. 14.)

Although the clutch or driving mechanism is shown in combination with braking mechanisms with which it coöperates, it is obvious that the said clutch may be employed without any of the braking mechanisms shown and without modification.

It remains to describe the construction of the brake mechanism. In the form of my invention illustrated in the accompanying drawings I have a braking mechanism on each side of the hub. The brake on the right-hand side of the hub consists of a disk K, that has a perforation through its center corresponding with the flattened portion of the inner hub C, upon which it is loosely placed so that it is revoluble with the inner hub C, but movable longitudinally thereon. This disk K is shown with an inward flange $k$, that lies against one of the members J' of the driving-clutch, and its outer side has a friction-surface adapted to engage with the friction-surface on or attached to the outer hub B, which conveniently may be back of the cup B³. When by back pedaling the clutch members J and J' are separated and the hub B is released from engagement with them, the said member J' is forced longitudinally against the flange k of the friction-disk K, and said disk is in turn brought into contact with the friction-surface of the cup B³, which is screwed into the hub B, and said hub is thereby retarded. At the other, the left-hand side of the hub, I provide a brake-shoe L, which in the form shown is split into the blocks L' L² L³ L⁴, Fig. 2, arranged around the block E, hereinabove referred to, which are retained upon said block E and in contact with each other by the spring-ring M, which encircles them, but permits them to be expanded against its tension outward from said block E and apart from each other. The spring M lies in a groove in the exterior of said shoes, as shown in Figs. 1 and 7. In the form shown that portion of the block with which the brake-blocks come in contact is square with beveled edges, as indicated by $e^2$, $e^3$, $e^4$, and $e^5$ in Fig. 2. Four brake-blocks of the same size and shape are employed and are formed to fit the said squared block E and to lie within the ring B' inside the hub B. The said shoes join each other above the beveled edges $e^2$, $e^3$, $e^4$, and $e^5$, respectively, of the said block E, and it should be noted that the radial distance from the circumference of said shoes to said beveled edges of said block E is less than the radial distance to any other point on the surface of said block, so that each brake-shoe constitutes a double wedge between the block E and ring B', the points of each double wedge being directed in an opposite direction. When the shoe L is divided, the outer surface of the block E may have any form other than cylindrical and concentric with the axis of the shoe. The outer surfaces $l$ of the brake-blocks are friction-surfaces adapted to engage with the friction-ring B'. The inner sides of the said blocks are hollowed out, so that when placed together around the block E the cavity thus formed within them is a regular hollow cone with the base of the cone next the outer hub B, and the clutch member J is conical so as to fit into the hollow cone in the brake-shoe L. A circular lip $l^2$ (see Fig. 10) is formed upon the edges of said shoe. Its function will hereinafter be described. The cup B², hereinbefore referred to as containing the balls $e'$, has a flange $b^3$ at an obtuse angle to its threaded portion, as shown in Figs. 1 and 7, whose outer surface is finished in a friction-surface, (conical in the form shown,) so that it may also constitute one member of a friction-brake. The other member of this brake consists of the said brake-blocks L' L² L³ L⁴ of the brake-shoe L, whose inner sides $l'$ (conical in the form shown) are formed at an angle with their outer sides $l$ that will cause the brake-shoe L to fit against the flange $b^3$. Thus the said brake-shoe is adapted also to come into braking contact with the frictional flange $b^3$ of the cup B². The operation of these several parts of this brake is as follows: When the clutch member J is forced against the inclined surfaces $l^3$ of the brake-blocks, the inclination of said surfaces $l^3$ causes the said blocks to be forced outwardly toward the friction-ring B' and the friction-surfaces $l$ to come in contact with said friction-ring, the pressure of the member J overcoming the tension of the spring M, and said blocks are at the same time forced against the friction-surface $b^3$ of the cup B² and are expanded both by the conical end of the member J and by the conical surface of the flange $b^3$. At the same time the back pressure on the clutch member J is resisted through the sleeve I, the clutch member J', the ring K, and the abutment B³. The revolution of the hub B, with the segments of the brake-shoe L pressing against it, produces a tendency of the brake-shoe to revolve with the hub, and this moves the segments with relation to the squared block E, so that the segments are wedged against the angular surfaces of said block, and because the block is held stationary by the arm G the wedging reacts against the hub, producing greater friction and more braking action thereby. This brake which I have described is capable of modification in many respects, and it is not necessary that it should exercise all of the functions which I have referred to above. More than four and less than four brake-blocks may be employed. It is also obvious that the shape of such blocks may be varied and that part of the squared block upon which they rest may be changed to correspond to them and that they will still be capable of performing the same functions. The friction-ring B' may be omitted, and the brake-shoe may press directly against the interior of the hub. The employment of a series of brake-blocks is not essential to this braking device. The shoe may be continuous and may be forced against a braking-surface attached to or forming part of the hub, such as that on the flange $b^{11}$, Fig. 14, and when a continuous brake-shoe is employed the clutch member may be attached to or integral with it, as shown in Figs. 14 and 15, Fig. 15 being a cross-section on the lines 15 15 of Fig. 14. One form of this modification is found in the parts J' K and the friction-surface on the abutment B³. The clutch member and the brake-shoe may therefore be considered as a single device movable longitudinally in one direction for clutching, in the other direction for braking, and having an intermediate position for coasting. In order to accelerate the operation of this brake and also to increase its efficiency, I have added another device to those already described for forcing the brake-shoe L or the brake-blocks L' L² L³ L⁴ out against the brake-surface. This device consists of a spring-latch. (Illustrated in the enlarged section, Fig. 10.) This latch $j^3$ is retained in a socket $j^4$ in the clutch member J in any suitable manner and is normally caused to project from beyond the surface of said clutch member by a spring O, that lies in a cavity $n$ in said latch and which bears against the shoulder $j^5$ at the end of said socket. Grooves $l^4$ are cut in the brake-shoe L or brake-blocks L' L² L³ L⁴, so as to leave shoulders (see Fig. 3) for engagement of the latch when the clutch member J moves backward. If the frictional contact between the clutch member J and the sleeve I is enough to cause said clutch member to rotate with said sleeve, the latch $j^3$ is forced by its spring O against said brake-shoe and into that one of said grooves which is nearest when the clutch member J is brought into contact with said brake-shoe, so that said latch comes in contact with the corresponding shoulder adjacent to such groove and prevents the further rotation of said clutch member J. In Figs. 11, 12, and 13 is shown a modification of the latching or clutching device. The latch or clutch $j^3$ is not used, and in its place a clutching means is employed consisting of a continuous series of teeth $j^{20}$ on the conical outer surface of the clutch member $J^{20}$, which replaces the clutch member J. Each brake-block $L^{20}$ of the series designated in the other figures, as L' L² L³ L⁴, has a narrow portion provided with teeth $l^{20}$, adapted to engage the teeth $j^{20}$ on the clutch member. Hence when the clutch member $J^{20}$ moves into contact with the brake-blocks $L^{20}$ the parts become firmly engaged, which effect is made more positive as the clutch member $J^{20}$ moves outward to the limit of its movement. Fig. 11 is an end view of one of the clutch members. Fig. 12 is an end view of one of the brake-blocks, and Fig. 13 is an interior view of the same brake-block shown in Fig. 12 looking toward the left. The braking mechanism is, however, operative without said latch or said clutch. As shown in Figs. 14 and 15, the part $E^{10}$ is squared, so as to fit within a squared portion of the brake-shoe $J^{10}$ when said brake-shoe has been shifted to the proper extent. The end, however, of the block or part $E^{10}$ is conical, so as to guide the brake-shoe $J^{10}$ into proper contact and connection with the squared portion thereof. In Fig. 15 the conical and squared portions of the block $E^{10}$ and the internally-squared cavity or socket in the brake-shoe $J^{10}$ are clearly shown.

It has been found in practice that the friction that may exist between the clutch members J and J' and the sleeve I is apt to cause said parts to revolve together, and as another means for overcoming this friction between said parts and in order to cause the clutch members to respond at once to the action of the pedals I employ the lip $l^2$ upon the brake-shoe L. The tension of the spring M tends to keep this lip in frictional contact at all times with the clutch member J, but with only enough pressure to overcome any possible friction between said clutch members and the sleeve I. When the clutch members J and J' are constructed so as to revolve easily on the sleeve I, the inertia of said clutch members is sufficient to permit them to be moved apart or toward each other on rotating the sleeve I by back or forward pedaling. There are therefore in this device two separate and independently-operating holding means for holding the clutch members J J' and each of them from rotation while they are being moved longitudinally by the shifting device, (the sleeve I). One of these holding means is the latch $j^3$, carried by the clutch J and operating substantially as above described, and the other of these holding means is the lip $l^2$ of the brake-shoe L, overhanging and pressing upon the exterior of the clutch device J. Each of these holding means is spring-pressed. The latch $j^3$ is a spring device seated in a recess, slot, or depression in the clutch-ring J, embodying the spring O and engaging the internal face of the brake-shoe L, and the lip or friction face or surface $l^2$ is a spring friction device because the brake-shoe L is divided into parts which are held together by the spring M, so that the lip $l^2$ presses with suitable friction upon a corresponding portion or friction face or surface on the clutch-ring J. Of course the spring M being a split ring is capable of such adjustability as to produce the desired friction for preventing rotation of the clutch-ring J, while the shifting device I is rotated to move the brake-shoe J longitudinally in the hub and to force it against the brake-surface on the flange $b^3$ of the cup $B^2$.

The operation of my device is as follows: When motion is conveyed to the inner hub C in forward pedaling, said hub rotates forwardly and the sleeve I is caused to rotate within the clutch members J and J' with their right and left hand screw-threads, respectively, and said members are carried toward each other until they come in contact with the conical portions $b^2$ of the outer hub B, whereupon they lock said hub firmly to the sleeve I and all of the parts are carried forward with the inner hub C. At the same time all pressure is removed from the frictional surface of the cup $B^3$ and the friction-ring K on the one side of the hub, and from the brake-shoe L and the several surfaces with which it is adapted to engage on the other side of the hub. Fig. 7 shows the position of these several parts in forward pedaling. In this figure the clutch is shown in engagement and the several brake mechanisms are shown out of engagement. If the pedals are held stationary while the hub revolves forward, the sleeve I and the clutch members J and J' are stopped, which causes the clutch members to separate just enough to release from the forward-driving position, thus freeing the hub and permitting it to revolve freely. The coasting position of the clutch members is intermediate between their braking positions and their driving positions. If the rotation of the pedals be reversed by back pedaling, the inner hub C, and with it the sleeve I, will be rotated backwardly and the clutch members J and J' will for the reasons above explained be carried apart, and accordingly out of engagement with the conical surfaces of the outer hub B. The member J' as it moves longitudinally from engagement with the outer hub B is brought into contact with the flange k of the friction-ring K, and thereby forces the said friction-ring out against the friction-surface of the cup or abutment B³ and retards the forward rotation of the outer hub. At the same time the other clutch member J as it is moved longitudinally outward toward the other end of the hub and is forced against the inclined surfaces l³ of the brake-blocks L' L² L³ L⁴ brings said brake-blocks against the friction-ring B' and also against the friction-surface of the flange b³ of the cup B² in the manner hereinbefore described. The said clutch member J may rotate until the end of the latch comes into engagement with one of the shoulders l⁵, after which further rotary movement of the clutch members is prevented and they are separated and force the brake-blocks out against the friction-surfaces of the hub in the manner above described. Similar action occurs with the modifications shown in Figs. 11, 12, and 13. The contact of the brake-blocks with the revolving hub tends to cause the brake-blocks to turn with the hub. The block E, however, cannot turn, and therefore the brake-blocks tilt on the squared block E, and this causes a further pressure to expand the brake-blocks and to increase the braking pressure on the hub. If it is desired to stop the forward movement of the bicycle abruptly, greater pressure can be put upon the pedals. It should also be noticed that by the peculiar construction and arrangement of parts which I have shown and described above no pressure is brought upon any of the bearings. In this respect I have obviated a very serious objection which is found in most of the back-pedaling devices heretofore constructed.

What I claim is—

1. In a driving and coasting mechanism, the combination of a hollow hub having bearings in its ends, a driving mechanism extending within the hub, a two-part clamping mechanism within the hub, means operated by said driving mechanism for moving the two parts of the clamping mechanism to and from each other, and a part attached to said hub and adapted to be clamped by the two parts of said clamping mechanism.

2. In a driving and coasting mechanism, the combination of a hollow hub having bearings at its ends, a driving mechanism including a part extending within the hub, an externally-threaded sleeve upon the part of the driving mechanism within the hub and longitudinally movable thereon but non-rotative with reference thereto, a two-part clamping mechanism upon said sleeve, said two parts being adapted to be moved to and from each other by said threaded sleeve, and a part within the hub and attached to the same and adapted to be clamped by said clamping mechanism.

3. In a driving and coasting mechanism, the combination of a hollow hub having bearings in its ends, a driving mechanism having a part extending within the hub, a sleeve having right and left threads thereon, said sleeve being upon said part of the driving mechanism within the hub and longitudinally movable thereon but non-rotative with reference thereto, a clamping mechanism consisting of two blocks upon the respective right and left hand threads of said sleeve and adapted to be moved to and from each other thereby, and a part within the hub and attached to the same and adapted to be clamped by said clamping mechanism.

4. In a driving and coasting mechanism, the combination of the hub B, having bearings in its ends, a driving mechanism comprising a sleeve C within the hub, a second sleeve I having external right and left hand threads thereon, the sleeve I being carried by the sleeve C and movable longitudinally thereon but non-rotative with reference thereto, internally-threaded conical clutch-blocks J, J' upon the respective right and left hand threads of the sleeve I, and conical clutch-surfaces b², b² within the hub, adapted to be clamped by said blocks, and a brake mechanism actuated by said clamping mechanism.

5. In a coaster-brake mechanism, a hollow hub having bearings in its ends, a driving mechanism extending within the hub, a two-part clamping mechanism within the hub, means operated by said driving mechanism for moving the two parts of the clamping mechanism to and from each other, a part attached to said hub and adapted to be clamped by the two parts of said clamping mechanism, and a brake mechanism actuated by said clamping mechanism.

6. In a coaster-brake mechanism, the combination of a hollow hub having bearings in its ends, a driving mechanism extending within the hub, a two-part clamping mechanism within the hub, screw mechanism upon said driving mechanism adapted to operate the two parts of said clamping mechanism, a part within the hub and attached thereto and adapted to be clamped by the two parts of said clamping mechanism, and a brake mechanism actuated by said clamping mechanism.

7. In a coaster-brake mechanism, the combination of a hollow hub having bearings at its ends, a driving mechanism including a part extending within the hub, an externally-threaded sleeve upon the part of the driving mechanism within the hub, and longitudinally movable thereon but non-rotative with reference thereto, a two-part clamping mechanism upon said sleeve, said two parts being adapted to be moved to and from each other by said threaded sleeve, a part within the hub and attached to the same and adapted to be clamped by said clamping mechanism, and a brake mechanism actuated by said clamping mechanism.

8. In a coaster-brake mechanism, the combination of a hollow hub having bearings in its ends, a driving mechanism having a part extending within the hub, a sleeve having right and left threads thereon, said sleeve being upon said part of the driving mechanism within the hub and longitudinally movable thereon but non-rotative with reference thereto, a clamping mechanism consisting of two blocks upon the respective right and left hand threads of said sleeve and adapted to be moved to and from each other thereby, a part within the hub and attached to the same and adapted to be clamped by said clamping mechanism, and a brake mechanism actuated by said clamping mechanism.

9. In a coaster-brake mechanism, the combination of the hub B, having bearings in its ends, an axle A therefor, a driving mechanism comprising a sleeve C within the hub, a second sleeve I having external right and left hand threads thereon, the sleeve I being carried by the sleeve C and movable longitudinally thereon but non-rotative with reference thereto, internally-threaded conical clutch-blocks J, J', upon the respective right and left hand threads of the sleeve I, conical clutch-surfaces $b^2$, $b^2$, within the hub adapted to be clamped by said blocks, and a brake mechanism actuated by one of said blocks.

10. In a driving and coasting mechanism, the combination of a frame, a hub revoluble on fixed bearings in the frame, a driving mechanism, a screw device rotating with said driving mechanism and capable of longitudinal movement with reference thereto, and a clamping mechanism consisting of two parts operated by said screw device to and from each other and adapted to clamp the hub for driving the same.

11. In a driving and coasting mechanism, the combination of a frame, a hub revoluble on fixed bearings in the frame, a driving mechanism, a screw device operated thereby, and a clamping mechanism consisting of two parts operated by said screw device to and from each other, and adapted to clamp the hub for driving the same.

12. A hollow wheel-hub, having bearings at its ends, and between said bearings a circumferential depression forming on the interior of the hub a surface adapted to be clamped by suitable mechanism for clamping and driving the hub, in combination with suitable clamping and driving mechanism.

13. In a brake mechanism for vehicle-wheels, the combination of a hub bearing an internal cylindrical brake-surface, a stationary block having a portion non-cylindrical on its exterior, a series of brake-blocks fitting around said non-cylindrical portion, a driving mechanism for said hub adapted to be released therefrom, and means operated by backward movement of the driving mechanism to cause the brake-blocks to turn upon said stationary block whereby they are pressed against said brake-surface.

14. In a brake mechanism for vehicle-wheels, the combination of a hub bearing an internal cylindrical brake-surface, a stationary block having a squared portion, a series of brake-blocks fitting around said squared portion, a driving mechanism for said hub adapted to be released therefrom, and means operated by backward movement of the driving mechanism to cause the brake-blocks to turn upon said stationary block whereby they are pressed against said brake-surface.

15. In a coaster-brake mechanism, the combination of a hub having bearings, a driving mechanism, a screw device rotating with said driving mechanism and capable of longitudinal movement with reference thereto, a clamping mechanism consisting of two parts operated by said screw device to move longitudinally in opposite directions to and from each other as the driving mechanism is moved forward or backward, and adapted to clamp the hub by movement to or from each other for driving the same on forward movement of the driving mechanism, and brake devices operated to press against the hub upon backward movement of the driving mechanism.

16. The combination of a hub, having a brake-surface and a clutch-surface therein, a non-rotative brake-shoe and a rotative clutch within the hub, said brake-shoe and clutch being movable longitudinally as to the hub, a driving mechanism and means actuated by the driving mechanism for operating said brake-shoe and clutch, whereby when the same are moved in one direction the clutch is set and the brake released, and when moved in the other direction, the brake is set and the clutch released, and when in an intermediate position, the hub is disconnected from both and said clutch is operated positively to clutch and to release the hub.

17. In a coaster-brake mechanism, the combination of a hollow hub having interior clutch and brake surfaces, a driving mechanism, friction means within the hub for connecting the driving mechanism with said clutch and brake surfaces, means within the hub operatively connected with the driving mechanism for moving said friction means longitudinally of the hub, and means adapted to be attached to the frame and extending within the hub for preventing rotation of the said friction means when engaging said brake-surface, substanially as described.

18. In a coaster-brake mechanism, the combination of the hollow hub B having bearings in its ends, a driving mechanism comprising a sleeve C within the hub, a second sleeve I having external right and left hand threads thereon, the sleeve I being carried by the sleeve C and movable longitudinally thereon but non-rotative with reference thereto, internally-threaded conical clutch-blocks J, J', upon the respective right and left hand threads of the sleeve I, the clutch-block J being conical on its outer end, conical clutch-surfaces $b^2$, $b^2$, within the hub adapted to be clamped by said blocks, an abutment at one end of the hub, an internally conical brake-shoe in the other end of the hub composed of clutch-blocks L', $L^2$, $L^3$, $L^4$, and the squared block E attached to the frame and fitting within said clutch-blocks.

19. In a coaster-brake mechanism, the combination of the hollow hub B having bearings in its ends, a driving mechanism comprising a sleeve C within the hub, a second sleeve I having external right and left hand threads thereon, the sleeve I being carried by the sleeve C and movable longitudinally thereon but non-rotative with reference thereto, internally-threaded conical clutch-blocks J, J' upon the respective right and left hand threads of the sleeve I, the clutch-block J being conical on its outer end, conical clutch-surfaces $b^2$, $b^2$, within the hub adapted to be clamped by said blocks, an abutment at one end of the hub, an internally conical brake-shoe in the other end of the hub composed of clutch-blocks L', $L^2$, $L^3$, $L^4$, the squared block E attached to the frame and fitting within said clutch-blocks, and a lip on said brake-blocks engaging the outer surface of the clutch-block J.

20. In a coaster-brake mechanism, the combination of the hollow hub B having bearings in its ends, a driving mechanism comprising a sleeve C within the hub, a second sleeve I having external right and left hand threads thereon, the sleeve I being carried by the sleeve C and movable longitudinally thereon but non-rotative with reference thereto, internally-threaded conical clutch-blocks J, J', upon the respective right and left hand threads of the sleeve I, the clutch-block J being conical on its outer end, conical clutch-surfaces $b^2$, $b^2$, within the hub adapted to be clamped by said blocks, an abutment at one end of the hub, an internally conical brake-shoe in the other end of the hub composed of clutch-blocks L', $L^2$, $L^3$ $L^4$, the squared block E attached to the frame and fitting within said clutch-blocks, and a spring device upon the clutch-block J for engaging notches on the inner surface of the brake-blocks and preventing the rotation of said clutch-block backward with relation thereto.

21. In a coaster-brake mechanism the combination of a hub having ball-bearings, a brake-surface and a clutch-surface; a brake-shoe; a friction-clutch movable longitudinally as to the hub and adapted to operate directly on the brake-shoe to force it into engagement with the hub when moving in one direction and directly on the clutch-surface when moving in the other direction; a driving mechanism; and operating means for said clutch, actuated by the driving mechanism whereby when the clutch is moved in one direction the clutch is set and the brake released, and when moved in the other direction the brake is set and the clutch released, and when in any intermediate position the hub is disconnected from both.

22. In a coaster-brake mechanism, the combination of a hub having ball-bearings; a brake-surface and a clutch-surface; an expansible brake-shoe; a friction-clutch, movable longitudinally as to the hub and adapted to operate directly both on the brake-shoe so as to expand the same without rotation, and on the clutch-surface; a driving mechanism; and operating means for said clutch actuated by the driving mechanism whereby when the clutch is moved in one direction the clutch is set and the brake released, and when moved in the other direction, the brake is set and the clutch released, and when in any intermediate position the hub is disconnected from both.

23. The combination of an axle, a wheel-hub mounted to rotate about said axle and provided with a brake-surface and a clutch-face, a brake-shoe located in and movable longitudinally in the hub, means for holding said brake-shoe from rotation, a longitudinally-movable clutch device arranged between said brake-shoe and said clutch-face on the wheel-hub, said clutch device having a driving clutch-face coöperating with said clutch-face on the hub, a shifting device for moving said clutch device longitudinally to move said brake-shoe longitudinally, means for operating the shifting device, and a holding device to hold said clutch device from rotation while being moved longitudinally.

24. The combination of an axle, a wheel-hub mounted to rotate about said axle and provided with a brake-surface and a clutch-face, a part consisting of a brake-shoe longitudinally movable in said hub and having a brake-surface coöperating with said brake-surface on the hub, means for holding the brake-shoe from rotation, a second part consisting of a longitudinally-movable clutch device arranged between said brake-shoe and said clutch-face on the hub, said clutch device having a driving clutch-face coöperating with said clutch-face on the hub and having a portion adapted to engage said brake-shoe to move the same longitudinally, means for shifting said clutch device longitudinally, and holding means carried by one of said parts and acting to hold said clutch device from rotation while being moved longitudinally.

25. The combination of an axle, a wheel-hub mounted to rotate about said axle and provided with a brake-surface and a clutch-face, a part consisting of a brake-shoe longitudinally movable in said hub and having a brake-surface coöperating with said brake-surface on the hub, means for holding the brake-shoe from rotation, a rotatable driving-sleeve, a second part consisting of a longitudinally-movable clutch device provided with a clutch-face coöperating with said clutch-face on the hub and with a face coöperating with a face on said brake-shoe, means operated by said driving-sleeve for shifting said clutch device longitudinally, and a friction device carried by one of said parts adapted to cause frictional engagement between said two parts.

26. The combination of an axle, a wheel-hub mounted to rotate about said axle and provided with a brake-surface and a clutch-face, a part consisting of a brake-shoe located in and longitudinally movable in the hub and provided with a braking-surface coöperating with said braking-surface on the hub, means for holding said brake-shoe from rotation, a rotatable driving-sleeve, a second part consisting of a longitudinally-movable clutch device provided with a clutch-face coöperating with said clutch-face on the hub, and with a face coöperating with a face on said brake-shoe, screw-threaded means operated by said driving-sleeve for shifting said clutch device longitudinally, and a friction device carried by one of said parts and adapted to cause frictional engagement between said two parts.

27. The combination of an axle, a wheel-hub mounted to rotate about said axle and provided with a brake-surface and a clutch-face, a brake-shoe located in and longitudinally movable in the hub and provided with a braking-surface coöperating with said braking-surface on the hub and with a second friction-surface, means for holding said brake-shoe from rotation, a rotatable driving-sleeve, a longitudinally-movable clutch device provided with a clutch-face coöperating with said clutch-face on the hub, and with a face coöperating with a face on said brake-shoe, means operated by said driving-sleeve for shifting said clutch device longitudinally, and a friction-surface carried by said clutch device and adapted to frictionally engage with the friction-surface carried by the brake-shoe, substantially as set forth.

28. The combination of an axle, a wheel-hub mounted to rotate thereon and provided with a brake-surface and a clutch-face, a part consisting of a brake-shoe arranged in said hub between said brake-surface and said clutch-face and having a face coöperating with said brake-surface and a friction-face, a part consisting of a longitudinally-movable clutch device arranged between said shoe and said clutch-face on the hub, means for moving the same longitudinally, a clutch-face on said clutch device coöperating with said clutch-face on the hub, friction means carried by one of said parts, and means for holding said friction means toward said friction-face on the brake-shoe and said clutch-face on the hub, substantially as set forth.

29. The combination of an axle, a hub mounted to rotate thereon and provided with a brake-surface and a clutch-face, a brake-shoe located in and longitudinally and radially movable in said hub between said brake-surface and said clutch-face and having an internal face, means for holding said brake-shoe from rotation, a clutch-ring arranged between said brake-shoe and said clutch-face on the hub and surrounded by said internal friction-face of the brake-shoe, a spring-pressed friction holding device seated in a recess in said clutch-ring and with said internal face on the brake-shoe, and means for shifting said clutch-ring longitudinally.

30. The combination of an axle, a hub mounted to rotate thereon and provided with a brake-surface and a clutch-face, a brake-shoe located in and longitudinally and radially movable in said hub between said brake-surface and said clutch-face and having internal notches and a friction-face, means for holding said brake-shoe from rotation, a clutch-ring arranged between said brake-shoe and said clutch-face on the hub and surrounded by said internal friction-face of the brake-shoe, a spring-pressed friction holding device seated in a recess in said clutch-ring and coöperating with said internal notches on the brake-shoe, and means for shifting said clutch-ring longitudinally, substantially as set forth.

31. The combination of an axle, a hub mounted to rotate thereon and provided with a brake-surface and a clutch-face, a brake-shoe arranged in the hub between said brake-surface and said clutch-face and provided with an internal face, means for holding said brake-shoe from rotation, a longitudinally-movable clutch-ring having a clutch-face coöperating with said clutch-face on the wheel-hub, and surrounded by said friction-face on said brake-shoe, said clutch-ring having a slot or depression therein, a holding device located in said slot or depression in the clutch-ring, a spring in said slot beneath said holding device and acting to move the same outwardly and into engagement with the internal face on the brake-shoe, and means for moving said clutch-ring laterally and rotating the same, substantially as set forth.

32. The combination of an axle, a wheel-hub mounted to rotate thereon and having a brake-surface and a conical clutch-face, a brake-shoe arranged in said hub between said brake-surface and said conical clutch-face and having an internal face, means for holding said brake-shoe from rotation, a threaded operating-sleeve, a clutch-ring having threads running on the threads of said sleeve and arranged between said brake-shoe and said conical clutch-face on the hub, and provided with a conical clutch-face and extending within said internal face of the brake-shoe, said clutch-ring having a slot therein, a holding device arranged in said slot, a spring in said slot beneath said friction holding device and tending to move the same into engagement with said internal face on the brake-shoe, means for holding said friction holding device and spring from longitudinal movement on the clutch-ring, substantially as set forth.

33. The combination of an axle, a wheel-hub mounted to rotate about said axle and provided with a brake-surface and a clutch-face, a brake-shoe longitudinally movable in said hub and having a brake-surface coöperating with said brake-surface on the hub, means for holding the brake-shoe from rotation, a longitudinally-movable clutch device arranged between said brake-shoe and said clutch-face on the hub, said clutch device having a driving clutch-face coöperating with said clutch-face on the hub, and having a part adapted to engage said brake-shoe to move the same longitudinally, means for shifting said clutch device longitudinally, and holding devices carried by said clutch device and acting to hold the same from rotation while being moved longitudinally, substantially as set forth.

GEORGE H. CHENEY.

Witnesses:
KATHARINE R. SPENCER,
ANNA G. MEAGHER.